United States Patent
Zhao (10) Patent No.: US 10,120,501 B2
(45) Date of Patent: Nov. 6, 2018

(54) TOUCH IMPLEMENTATION METHOD AND DEVICE AND ELECTRONIC DEVICE

(71) Applicant: BOE TECHNOLOGY GROUP CO., LTD., Beijing (CN)

(72) Inventor: Xingxing Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 194 days.

(21) Appl. No.: 15/086,729

(22) Filed: Mar. 31, 2016

(65) Prior Publication Data

US 2016/0342279 A1 Nov. 24, 2016

(30) Foreign Application Priority Data

May 19, 2015 (CN) .......................... 2015 1 0257058

(51) Int. Cl.
*G06F 3/041* (2006.01)
*G06F 3/042* (2006.01)

(52) U.S. Cl.
CPC .......... *G06F 3/0418* (2013.01); *G06F 3/0425* (2013.01); *G06F 2203/04101* (2013.01)

(58) Field of Classification Search
CPC ...... G06F 3/0418; G06F 3/0425; G06F 3/041; G06F 3/011
USPC ....................................................... 345/174
See application file for complete search history.

(56) References Cited

U.S. PATENT DOCUMENTS

| | | | | |
|---|---|---|---|---|
| 9,304,582 B1* | 4/2016 | Kamarshi | ............... | G06F 3/011 |
| 9,513,765 B2* | 12/2016 | Miyazaki | ............... | G06F 3/041 |
| 2004/0022154 A1* | 2/2004 | Yang | ................... | G11B 19/2009 |
| | | | | 369/53.3 |
| 2008/0036766 A1* | 2/2008 | Ishii | ....................... | G09B 29/12 |
| | | | | 345/427 |
| 2009/0046079 A1 | 2/2009 | Inoue et al. | | |
| 2009/0109195 A1* | 4/2009 | Kent | ..................... | G06F 3/0418 |
| | | | | 345/178 |
| 2010/0245576 A1* | 9/2010 | Inui | ....................... | G06T 7/0018 |
| | | | | 348/148 |

(Continued)

FOREIGN PATENT DOCUMENTS

| | | |
|---|---|---|
| CN | 102591525 A | 7/2012 |
| CN | 103472953 A | 12/2013 |
| CN | 103488368 A | 1/2014 |

OTHER PUBLICATIONS

Chinese Office Action in Chinese Application No. 201510257058.9, dated May 18, 2017 with English translation.

*Primary Examiner* — Fred Tzeng
(74) *Attorney, Agent, or Firm* — Collard & Roe, P.C.

(57) ABSTRACT

A touch implementation method and device and an electronic device are provided, and the method includes: displaying N calibration points for user touch by a display screen of an electronic device; acquiring first coordinates of the N calibration points for user touch; acquiring second coordinates of the N calibration points; and calculating a mapping parameter between a first coordinate of a point and a second coordinate of the point according to the first coordinates of the N calibration points and the second coordinates of the N calibration points. The mapping parameter is configured for acquiring a first coordinate of a touch point touched by the user upon a user touching the display screen. Embodiments of present disclosure can reduce the cost of the electronic.

18 Claims, 4 Drawing Sheets

(56) References Cited

U.S. PATENT DOCUMENTS

| | | | | |
|---|---|---|---|---|
| 2012/0007985 A1* | 1/2012 | Inui | ............... | H04N 17/002 |
| | | | | 348/148 |
| 2013/0027544 A1* | 1/2013 | Chang | ............... | G01B 21/04 |
| | | | | 348/135 |
| 2014/0380163 A1* | 12/2014 | Peng | ............... | H04N 7/18 |
| | | | | 715/717 |
| 2016/0188109 A1* | 6/2016 | Wang | ............... | G06F 3/011 |
| | | | | 345/173 |
| 2016/0349918 A1* | 12/2016 | Dongre | ............... | G06F 3/0418 |

* cited by examiner

TOUCH IMPLEMENTATION METHOD AND DEVICE AND ELECTRONIC DEVICE

TECHNICAL FIELD

At least one embodiment of the present disclosure relates to a touch implementation method and device and an electronic device.

BACKGROUND

At present, many electronic devices (e.g., mobile phones and tablet PCs) have touch function, namely a user can operate an electronic device by touching a display screen. Common touchable display panels include capacitive touch panels, resistive touch panels, etc.

A capacitive touch panel or a resistive touch panel is generally disposed on an electronic device and has the same size with the display screen of the electronic device.

SUMMARY

At least one embodiment of the present disclosure provides a touch implementation method and device and an electronic device, which are used for reducing the cost of the electronic device.

In a first aspect, at least one embodiment of present disclosure provides a touch implementation method, which includes: displaying N calibration points for user touch by a display screen of an electronic device; acquiring first coordinates of the N calibration points for user touch, in which step a first coordinate of a point refers to a pixel coordinate, at the display screen of the electronic device, of the point, the pixel coordinate is defined by a pixel distance to a default pixel at the display screen, first coordinates of at least three of the N calibration points allow the three of the N calibration points to be not in a same straight line upon the three of the N calibration points being displayed by the display screen, N≥3 and N is an integer; acquiring second coordinates of the N calibration points, in which step a second coordinate of the point refers to a three-dimensional coordinate detected by a depth device upon the point being touched by a user; and calculating a mapping parameter between the first coordinate of the point and the second coordinate of the point according to the first coordinates of the N calibration points and the second coordinates of the N calibration points, in which step the mapping parameter is configured for acquiring a first coordinate of a touch point touched by the user upon the user touching the display screen.

In a second aspect, at least one embodiment of present disclosure provides a touch implementation device, which includes a display screen, a first acquisition unit, a second acquisition unit and a first calculating element. The display screen is configured to display N calibration points for user touch. The first acquisition unit is configured to acquire first coordinates of the N calibration points for user touch, a first coordinate of a point refers to a pixel coordinate of the point at the display screen; the pixel coordinate is defined by a pixel distance to a default pixel at the display screen; first coordinates of at least three of the N calibration points allow the three of the N calibration points to be not in a same straight line upon the three of the N calibration points being displayed by the display screen; and N≥3 and N is an integer. The second acquisition unit is configured to acquire second coordinates of the N calibration points, and a second coordinate of the point refers to a three-dimensional coordinate detected by a depth device upon the point being touched by a user. The first calculating element is configured to calculate a mapping parameter between the first coordinate of the point and the second coordinate of the point according to the first coordinates of the N calibration points and the second coordinates of the N calibration points, and the mapping parameter is configure for acquiring a first coordinate of a touch point touched by the user upon the user touching the display screen.

In a third aspect, at least one embodiment of present disclosure further provides a touch implementation device, which includes a memory and a processor, the memory is configured to store a code which is configured for controlling the processor to execute a following action: displaying N calibration points for user touch by a display screen; acquiring first coordinates of the N calibration points, in which step a first coordinate of a point refers to a pixel coordinate, at the display screen, of the point, and first coordinates of at least three of the calibration points allow the three of the calibration points to be not in a same straight line upon the three of the calibration points being displayed by the display screen; acquiring second coordinates of the N calibration points, in which step a second coordinate of the point refers to a three-dimensional coordinate detected by a depth device upon the point being touched by a user; and calculating a mapping parameter between the first coordinate of the point and the second coordinate of the point according to the first coordinates of the N calibration points and the second coordinates of the N calibration points, in which step the mapping parameter is configured for acquiring a first coordinate of a touch point touched by the user upon the user touching the display screen.

At least one embodiment of present disclosure further provides an electronic device which includes any one of the above touch implementation devices.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which is to be within the scope of the disclosure.

The inventor of the application noted in study that a current electronic device needs to be equipped with a touch panel, which has the same size with the display screen of the electronic device, to achieve a touch function. Thus, every new-size touch panel needs to be redeveloped, and this lead to the increase of the cost of the electronic device.

First Embodiment

Figure 1:
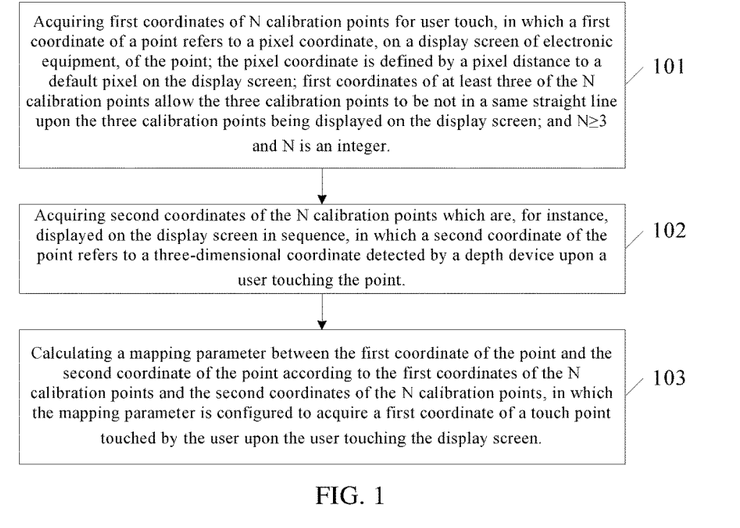
FIG. 1 is a flowchart of a touch implementation method provided by an embodiment of the present disclosure.

The embodiment of the present disclosure provides a touch implementation method. As illustrated in FIG. 1, the method includes the following steps S101 to S103. Detailed description will be given below.

Step S101: acquiring first coordinates of N calibration points for user touch (namely the number of the calibration points is N). In the step, a first coordinate of a point refers to a pixel coordinate, at a display screen of an electronic device, of the point; the pixel coordinate is defined by a pixel distance to a default pixel (a predetermined pixel) at the display screen; first coordinates of at least three of the N calibration points allow the three calibration points to be not in a same straight line in a situation where the three calibration points are displayed by the display screen; and N≥3 and N is an integer.

The executing body of the embodiment of the present disclosure may be an electronic device, e.g., a depth device which is, for instance, a depth sensor.

It is to be noted that the depth device can detect changes of body movement within the viewing angle of the depth device and acquire a three-dimensional coordinate of a certain part of body limbs. For instance, the depth device may adopt technology such as time of flight (TOF), structured light and stereo vision to achieve the above function. Common depth devices include Kinect 3D (three-dimensional) scanner, Primesense motion sensing equipment and PS4 Eye motion controller. The Kinect 3D scanner applies the TOF technology; the Primesense motion sensing equipment applies the structured light technology; and the PS4 Eye motion controller applies the stereo vision technology. The viewing angle range of the depth device in the embodiment of the present disclosure covers the display screen of the electronic device. The depth device may be directly arranged (for example, clamped) at the edge of the display screen and may also be disposed near the display screen, as long as the depth device is disposed on a display side of the display screen, so as to detect the touch action of a user.

For instance, the pixel coordinate of the point may be represented together by a horizontal pixel distance and a vertical pixel distance which are from the point to the default pixel (may also be referred to as a specified pixel or a predetermined pixel) at the display screen, and meanwhile, points disposed at different areas of the display screen can be distinguished through the positive or negative value of the horizontal pixel distance and the positive or negative value of the vertical pixel distance. That is to say, the default pixel is an origin of coordinates of a coordinate system in which the pixel coordinate of the point is located. The default pixel may be an angular vertex of the display screen or a center point of the display screen, or even any point at the display screen. In addition, the pixel coordinate refers to the coordinate of a pixel, corresponding to the point, in the coordinate system taking the default pixel as the origin. That is to say, the horizontal pixel distance is an integer value of the ratio of the horizontal distance, from the center of the pixel corresponding to the point to the center of the default pixel, to the horizontal dimension of the pixel, and the vertical pixel distance refers to an integer value of the ratio of the vertical distance, from the center of the pixel corresponding to the point to the center of the default pixel, to the vertical dimension of the pixel.

Figure 2A:
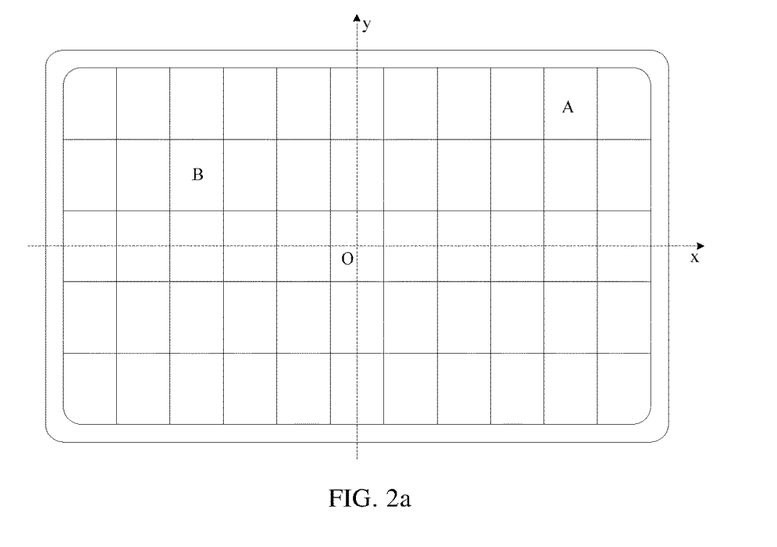
FIG. 2a is a schematic view of a pixel coordinate system in an embodiment of the present disclosure.

Illustratively, as illustrated in FIG. 2a which illustrates a display screen of an electronic device, each small rectangle in the display screen indicates a pixel; a pixel coordinate system is created by taking a default pixel O as an origin of coordinates; coordinate axes of the coordinate system are respectively x-axis and y-axis (represented by dotted lines in FIG. 2a); and the pixel coordinate of the default pixel O is (0, 0). An A point is disposed in the first quadrant, the horizontal pixel distance from the A point to the origin of coordinates is 4, the vertical pixel distance is 2, and the pixel coordinate of the A point is (4, 2). A B point is disposed in the second quadrant, the horizontal pixel distance from the B point to the origin of coordinates is 3, the vertical pixel distance is 1 and the pixel coordinate of the B point is (−3, 1).

In the embodiment, when the electronic device (e.g., the depth device) determines the first coordinates of the N calibration points, the first coordinates of at least three of the N calibration points allow the three calibration points to be not in the same straight line in a situation where the three calibration points are displayed by the display screen.

Figure 2B:
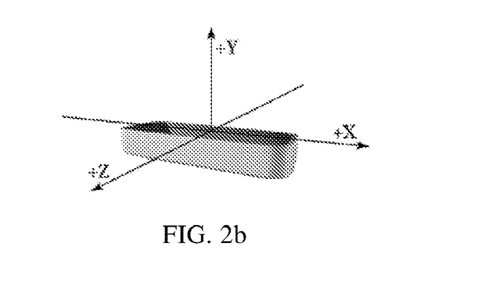
FIG. 2b is a schematic view of a coordinate system in which (three-dimensional) 3D coordinates detected by a depth device are located in an embodiment of the present disclosure.

For instance, the coordinate system in which 3D coordinates detected by the depth device is located may be as shown in FIG. 2b. The 3D coordinate system, for instance, is a 3D coordinate system taking the center of an emitting surface of the depth device as an origin. Of course, the setting means of the 3D coordinate system in the embodiment of the present disclosure includes, but not limited to, the means as shown in FIG. 2b.

For instance, before or after the step S101, the method may further include: allowing the electronic device to display the N calibration points on the display screen of the electronic device in sequence (namely the N calibration points are displayed on the display screen one by one). That is to say, after one calibration point is displayed on the display screen and touched by the user, the next calibration point is displayed.

For instance, in a case where the first coordinates of the N calibration points are acquired after the N calibration points are displayed on the display screen, an image of the display screen on which the calibration points are displayed may be acquired through an image acquisition device (e.g., an image sensor such as a charge-coupled device (CCD) camera), and the first coordinates, on the display screen, of the calibration points are acquired by processing the image.

S102: acquiring second coordinates of the N calibration points, for instance, acquiring the second coordinates of the N calibration points displayed on the display screen in sequence. In the step, the second coordinate of the point refers to a 3D coordinate detected by the depth device in a situation where the point is touched by a user.

In the step S102, one calibration point corresponds to one first coordinate and one second coordinate.

It is to be noted that upon adopting such means that the N calibration points are displayed by the display screen in sequence, after the electronic device displays one calibration point on the display screen of the electronic device and acquires that the second coordinate of the point is detected by the depth device, the next calibration point is displayed. For instance, after the second coordinate of the point is detected by the depth device, a notification message can be sent to the electronic device or the second coordinate of the point can be directly sent to the electronic device, and hence the electronic device is triggered to display the next calibration point. Thus, the first coordinate and the second coordinate of each calibration point can be simply and accurately detected. Of course, the method provided by the embodiment of the present disclosure includes, but not limited to, the means of displaying the N calibration points in sequence, as long as the first coordinate and the second coordinate of each calibration point can be in one-to-one correspondence.

In addition, the display screen may be a display screen of a depth device, namely the electronic device may be a depth device. Of course, the display screen may also be a display screen of other electronic device.

S103: calculating a mapping parameter between the first coordinate of the point and the second coordinate of the point according to the first coordinates of the N calibration points and the second coordinates of the N calibration points. The mapping parameter is used for acquiring a first coordinate of a touch point touched by a user when the user touches the display screen.

For instance, in the step S103, in practice, the mapping parameter can be calculated according to any three calibration points, which are not in the same straight line when displayed on the display screen, of the N calibration points.

Optionally, for instance, after the step S103, the method may further include the following steps 1) and 2): 1) acquiring a second coordinate of the touch point touched by the user when the user touches the display screen; and 2) calculating the first coordinate of the touch point according to the second coordinate of the touch point and the mapping parameter.

In the step, in a situation where the user touches the display screen via a finger within the viewing angle range of the depth device, the depth device can detect a 3D coordinate of the finger of the user. The 3D coordinate is the second coordinate of the touch point.

For instance, after the step 2), the method may further include: allowing the electronic device to feed back the first coordinate to an operating system of the electronic device, and allowing the operating system to operate an application program of the electronic device according to the first coordinate.

Optionally, for instance, in practice, the step S103 may include: calculating the mapping parameters $K_0$, $K_1$, $K_2$, $K_3$, $K_4$ and $K_5$ between the first coordinate of the point and the second coordinate of the point according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases},$$

in which $(M_0, N_0)$ is a first coordinate of a first calibration point; $(M_1, N_1)$ is a first coordinate of a second calibration point; $(M_2, N_2)$ is a first coordinate of a third calibration point; $(X_0, Y_0, Z_0)$ is a second coordinate of the first calibration point; $(X_1, Y_1, Z_1)$ is a second coordinate of the second calibration point; $(X_2, Y_2, Z_2)$ is a second coordinate of the third calibration point; and the first calibration point, the second calibration point and the third calibration point displayed on the display screen are not in the same straight line.

For instance, the first calibration, the second calibration point and the third calibration point may be any three calibration points, which are not in the same straight line when displayed on the display screen, of the N calibration points. For instance, in order to improve the accuracy of the mapping parameter calculated, the electronic device (e.g., the depth device) may calculate a plurality of groups of mapping parameters by the above optional method, and the final mapping parameter is obtained by the averaging of $K_0$, $K_1$, $K_2$, $K_3$, $K_4$ and $K_5$ in the plurality of groups of mapping parameters respectively.

On the basis of the implementation of the step S103, optionally, for instance, in practice, the step 2) may be as follows: calculating the first coordinate of the touch point according to $$\begin{cases} M = K_0 X + K_1 Y + K_2 Z \\ N = K_3 X + K_4 Y + K_5 Z \end{cases},$$

in which (M, N) is the first coordinate of the touch point, and (X, Y, Z) is the second coordinate of the touch point.

Optionally, for instance, before the step S101, the method may further include: detecting whether the mapping parameter needs to be calibrated. In this case, the step S101, for instance, may include: acquiring the first coordinates of the N calibration points for user touch in a situation where the mapping parameter needs to be calibrated.

It is to be noted that in a situation where the electronic device (e.g., the depth device) detects that the mapping parameter has not been calibrated, it indicates that the depth device is connected with the electronic device for the first time, so it is determined that the mapping parameter needs to be calibrated; and in a situation where the electronic device detects that the mapping parameter has been calibrated, it indicates that the electronic device is not connected with the depth device for the first time, so it is determined that the mapping parameter does not need to be calibrated. For instance, the electronic device (e.g., the depth device) may determine whether the mapping parameter has been calibrated according to the way of determining whether the mapping parameter is stored.

In addition, the user may control the depth device or the electronic device to calibrate the mapping parameter in the case that inaccuracy is found upon touching the display screen or upon detecting changes in the relative position between the depth device and the electronic device.

In the embodiment of the present disclosure, in practice, suspension touch may be adopted upon the user touching the calibration points displayed on the display screen, namely touch objects such as a finger of the user or a touch pen may not make contact with the display screen. In this case, suspension touch can be achieved upon the user touching the display screen.

In the method provided by the embodiment of the present disclosure, the electronic device (e.g., the depth device) can calculate the mapping parameter between the first coordinate of the point and the second coordinate of the point according to the first coordinates and the second coordinates of the calibration points, and calculate the first coordinate of the touch point touched by the user by utilization of the mapping parameter upon the user touching the display screen of the electronic device, so as to touch control the electronic device. In the method provided by the embodiment of the present disclosure, some electronic devices without touch panels which are configured to achieve a touch function can also achieve touch. In addition, electronic devices provided with display screens of different sizes can all achieve touch by the method, without providing a touch panel to each electronic device. Thus, the cost of the electronic device can be reduced.

Second Embodiment

Figure 3:
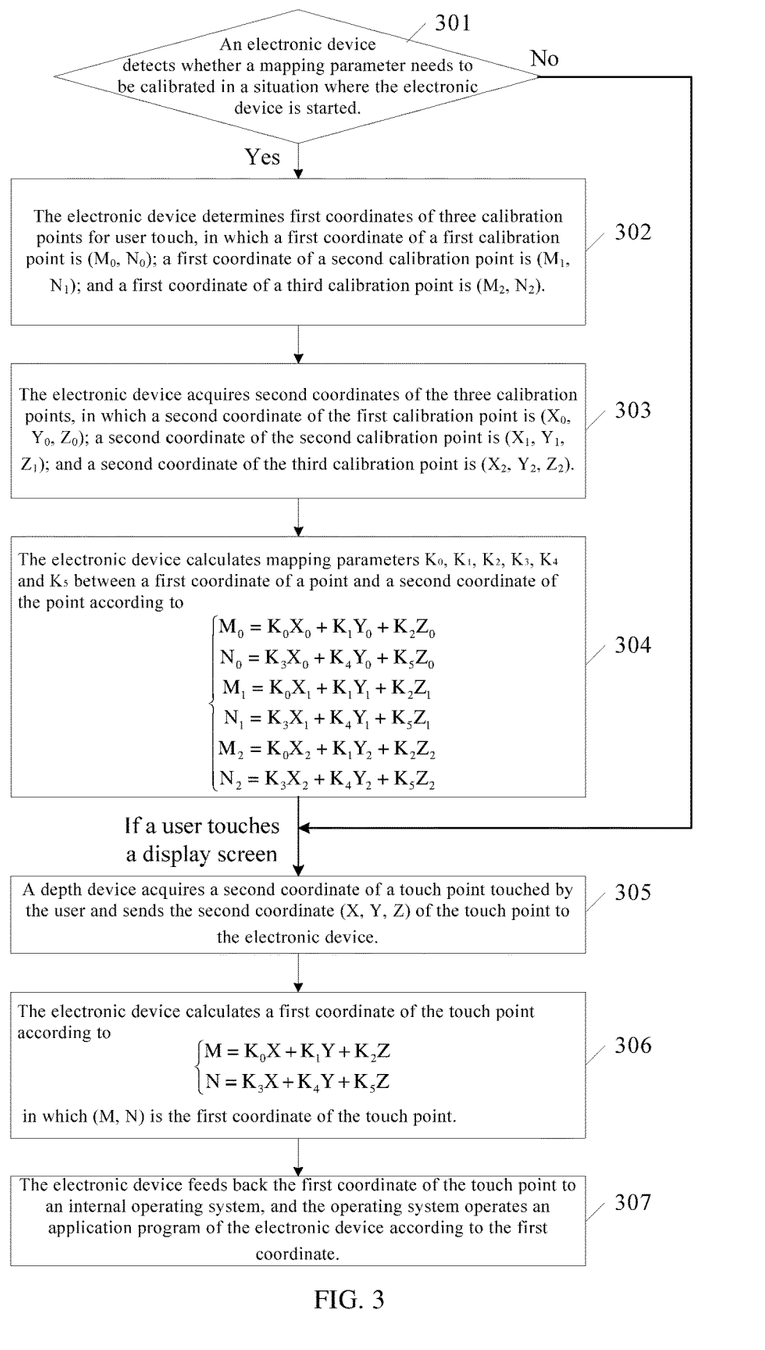
FIG. 3 is another flowchart of a touch implementation method provided by an embodiment of the present disclosure.

Further illustration is given in the embodiment of the present disclosure to the touch implementation method provided by the first embodiment. Description is given in the embodiment by taking N=3 as an example. As illustrated in FIG. 3, the method includes the following steps S301 to S307. Detailed description will be given below.

Step S301: an electronic device detects whether a mapping parameter needs to be calibrated in a situation where the electronic device is started.

If so (namely if the mapping parameter needs to be calibrated), the steps S302 to S307 are executed. If not (namely if the mapping parameter does not need to be calibrated), and the user touches the display screen of the electronic device, the steps S305 to S307 are executed.

For instance, the electronic device determines that the mapping parameter needs to be calibrated upon detecting that the mapping parameters $K_0$, $K_1$, $K_2$, $K_3$, $K_4$ and $K_5$ are not stored into the electronic device, and determines that the mapping parameter does not need to be calibrated upon detecting that the mapping parameters $K_0$, $K_1$, $K_2$, $K_3$, $K_4$ and $K_5$ are stored into the electronic device.

It is to be noted that relevant explanation in the embodiment can be referred to the first embodiment.

Step S302: the electronic device determines first coordinates of three calibration points for user touch. The first coordinate of a first calibration point is $(M_0, N_0)$; the first coordinate of a second calibration point is $(M_1, N_1)$; and the first coordinate of a third calibration point is $(M_2, N_2)$.

For instance, the electronic device may determine in real time the first coordinates of the three calibration points, or the first coordinates of the three calibration points may also be prestored into a memory of the electronic device. The first coordinates of the three calibration points allow the three calibration points to be not in the same straight lines upon the three calibration points being displayed by the display screen of the electronic device.

Step S303: the electronic device acquires second coordinates of the three calibration points. The second coordinate of the first calibration point is $(X_0, Y_0, Z_0)$; the second coordinate of the second calibration point is $(X_1, Y_1, Z_1)$; and the second coordinate of the third calibration point is $(X_2, Y_2, Z_2)$.

For instance, the electronic device may acquire the second coordinate of one calibration point through the following steps S11) and S12).

Step S11): the electronic device displays one of the three calibration points on the display screen.

Step S12): upon a user touching the calibration point displayed on the display screen, the depth device acquires the second coordinate of the calibration point and sends the second coordinate of the calibration point to the electronic device.

In the steps 11) and 12), in practice, after the electronic device displays one calibration point on the display screen and receives the second coordinate of the calibration point sent by the depth device, the next calibration point is displayed on the display screen. The electronic device may acquire the second coordinates of the three calibration points by the above method.

Step S304: the electronic device calculates the mapping parameters $K_0$, $K_1$, $K_2$, $K_3$, $K_4$ and $K_5$ between the first coordinate of the point and the second coordinate of the point according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases}.$$

After the step S304, if the user touches the display screen, the method may further include the following steps S305 to S307.

Step S305: the depth device acquires a second coordinate of a touch point touched by the user and sends the second coordinate (X, Y, Z) of the touch point to the electronic device.

Step S306: the electronic device calculates a first coordinate of the touch point according to $$\begin{cases} M = K_0 X + K_1 Y + K_2 Z \\ N = K_3 X + K_4 Y + K_5 Z \end{cases},$$

in which (M, N) is the first coordinate of the touch point.

Step S307: the electronic device feeds back the first coordinate of the touch point to an internal operating system, and the operating system operates an application program of the electronic device according to the first coordinate.

In the method provided by the embodiment of the present disclosure, the electronic device (e.g., the depth device) may calculate the mapping parameters between the first coordinate and the second coordinate of the point according to the first coordinates and the second coordinates of the calibration points, calculate the first coordinate of the touch point touched by the user by utilization of the mapping parameters upon the user touching the display screen of the electronic device, so as to touch control the electronic device. In the method provided by the embodiment of the present disclosure, some electronic devices without touch panels configured for achieving touch function can also achieve touch. In addition, electronic devices provided with display screens of different sizes can all achieve touch by the method without the need of being equipped with a touch panel, and hence the cost of the electronic device can be reduced.

Third Embodiment

Figure 4A:
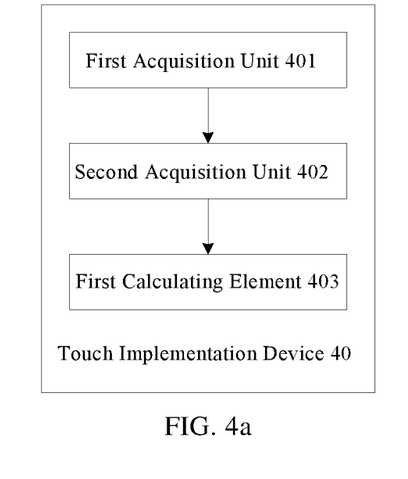
FIG. 4a is a schematic structural view of a touch implementation device provided by an embodiment of the present disclosure.

The embodiment of the present disclosure provides a touch implementation device 40, which is configured for achieving the touch implementation method as shown in FIG. 1. As illustrated in FIG. 4a, the device 40 includes a display screen, a first acquisition unit 401, a second acquisition unit 402 and a first calculating element 403. Detailed description will be given below.

The first acquisition unit 401 is configured to acquire first coordinates of N calibration points for user touch (namely the number of the calibration points for user touch is N). A first coordinate of a point refers to a pixel coordinate of the point on a display screen of an electronic device; the pixel coordinate is defined by a pixel distance to a default pixel on the display screen; first coordinates of at least three of the N calibration points allow the three calibration points to be not in a same straight line upon the three calibration points being displayed on the display screen; and N≥3 and N is an integer.

The second acquisition unit 402 is configured to acquire second coordinates of the N calibration points displayed on the display screen, e.g., in sequence. A second coordinate of the point refers to a three-dimensional coordinate detected by a depth device upon the point being touched by a user. For instance, the second acquisition unit 402 may be a depth device or be integrated into a depth device.

The first calculating element 403 is configured to calculate a mapping parameter between the first coordinate of the point and the second coordinate of the point according to the first coordinates of the N calibration points and the second coordinates of the N calibration points. The mapping parameter is used for acquiring a first coordinate of a touch point touched by the user upon the user touching the display screen.

Figure 4B:
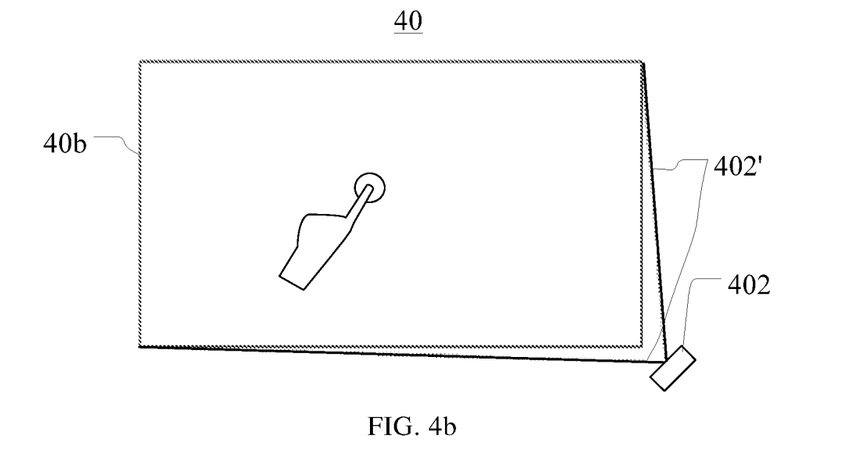
FIG. 4b is a schematic plan view of a display screen and a second acquisition unit in a touch implementation device provided by an embodiment of the present disclosure.

For instance, a plan view of the second acquisition unit 402 and the display screen 40b in the device 40 provided by at least one embodiment of the present disclosure may be as shown in FIG. 4b. The second acquisition unit 402 may be disposed on a display side of the display screen 40b, for instance, disposed at an edge of the display side of the display screen 40b. For instance, the viewing angle of the second acquisition unit 402 may be as shown in FIG. 402'.

For instance, the first acquisition unit 401 and the first calculating element 403 may be independently arranged respectively. For example, the first acquisition unit 401 can be an image acquisition device (e.g., an image sensor such as a charge-coupled device (CCD) camera) configured to acquire an image of the display screen which displays at least one calibration point and to process the image to acquire the first coordinate of the calibration point; and for example, the first calculating element 403 can be achieved through a general purpose computer (for example, a central processing unit which is short for CPU), a dedicated computing device (for example, a digital signal processor which is short for DSP) and so on. Certainly, the first acquisition unit 401 and the first calculating element 403 may also be integrated into the display screen 40b. Of course, the embodiment of the present disclosure includes, but not limited to, the implementations.

For instance, optionally, the first calculating element 403 may be configured to: calculate the mapping parameters $K_0$, $K_1$, $K_2$, $K_3$, $K_4$ and $K_5$ between the first coordinate of the point and the second coordinate of the point according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases},$$

in which, $(M_0, N_0)$ is a first coordinate of a first calibration point; $(M_1, N_1)$ is a first coordinate of a second calibration point; $(M_2, N_2)$ is a first coordinate of a third calibration point; $(X_0, Y_0, Z_0)$ is a second coordinate of the first calibration point; $(X_1, Y_1, Z_1)$ is a second coordinate of the second calibration point; $(X_2, Y_2, Z_2)$ is a second coordinate of the third calibration point; and the first calibration point, the second calibration point and the third calibration point displayed on the display screen are not in the same straight line.

For instance, optionally, the second acquisition unit 402 may also be configured to acquire a second coordinate of the touch point touched by the user upon the user touching the display screen.

Figure 5:
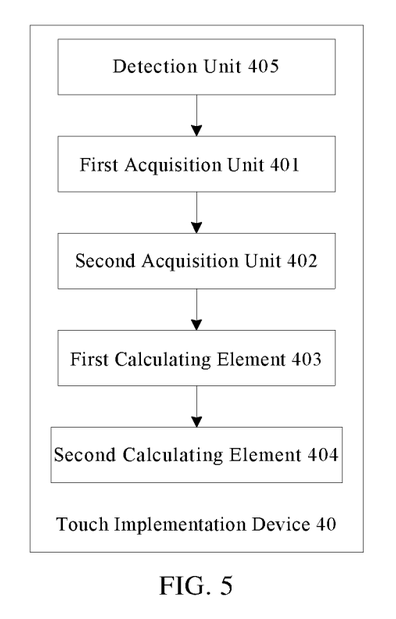
FIG. 5 is another schematic structural view of a touch implementation device provided by an embodiment of the present disclosure.

In at least one example of the embodiment, as illustrated in FIG. 5, the device 40 may further include a second calculating element 404 which is configured to calculate the first coordinate of the touch point according to the second coordinate of the touch point and the mapping parameter.

For instance, optionally, the second calculating element 404 may be configured to: calculate the first coordinate of the touch point according to $$\begin{cases} M = K_0 X + K_1 Y + K_2 Z \\ N = K_3 X + K_4 Y + K_5 Z \end{cases},$$

in which (M, N) is the first coordinate of the touch point, and (X, Y, Z) is the second coordinate of the touch point.

For example, the second calculating element 404 can be achieved through a general purpose computer (for example, a central processing unit which is short for CPU), a dedicated computing device (for example, a digital signal processor which is short for DSP) and so on.

In at least one example of the embodiment, optionally, as illustrated in FIG. 5, the device 40 further includes a detection unit 405 which is configured to detect whether the mapping parameter needs to be calibrated. In this case, for instance, the first acquisition unit 401 may also be configured to: acquire the first coordinates of the N calibration points for user touch in a situation where the mapping parameter needs to be calibrated.

For instance, the touch implementation device provided by the embodiment of the present disclosure may be disposed in the depth device and may also be disposed in other electronic devices. Relevant explanation in the embodiment of the present disclosure can be referred to the above embodiments.

In a situation where the device provided by the embodiment of the present disclosure is disposed in the electronic device (e.g., the depth device), the electronic device can calculate the mapping parameter between the first coordinate and the second coordinate of the point according to the first coordinates and the second coordinates of the calibration points, and calculate the first coordinate of the touch point touched by the user by utilization of the mapping parameter upon the user touching the display screen of the electronic device, so as to touch control the electronic device. The device provided by the embodiment of the present disclosure allows some electronic devices without touch panels configured for achieving touch function can also achieve touch. On the other hand, electronic devices provided with display screens of different sizes can all achieve touch via the device without the need of providing a touch panel to each electronic device, and hence the cost of the electronic device can be reduced.

Fourth Embodiment

In hardware implementation, the modules (namely the first acquisition unit, the second acquisition unit, the first calculating element, the second calculating element and the detection unit) in the third embodiment may be embedded into or independent of a processor of the electronic device (e.g., the depth device) in the form of hardware and may also be stored into the memory of the electronic device in the form of software, so that the processor can conveniently call and execute corresponding operations of the modules. The processor may be a central processing unit (CPU), a microprocessor, a singlechip, etc.

Figure 6:
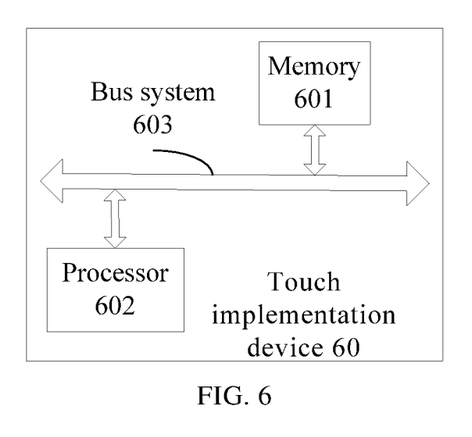
FIG. 6 is still another schematic structural view of a touch implementation device provided by an embodiment of the present disclosure.

As illustrated in FIG. 6, a touch implementation device 60 provided by the embodiment of the present disclosure is provided and used for achieving the touch implementation method as shown in FIG. 1. The device 60 includes: a memory 601, a processor 602 and a bus system 603.

The memory 601 and the processor 602 are coupled together through the bus system 603, and the bus system 603 not only includes a data bus but also may include a power bus, a control bus, a status signal bus, etc. But for clarity, all the buses in the figure are marked as the bus system 603.

The memory 601 is configured to store one group of codes which are used for controlling the processor 602 to carry out the following action: acquiring first coordinates of N calibration points for user touch. A first coordinate of a point refers to a pixel coordinate, on a display screen of an electronic device, of the point; the pixel coordinate is defined by a pixel distance to a default pixel on the display screen; first coordinates of at least three of the N calibration points allow the three calibration points to be not in a same straight line upon the three calibration points being displayed on the display screen; and N≥3 and N is an integer.

The processor 602 is also configured to: acquire second coordinates of the N calibration points displayed on the display screen, e.g., displayed on the display screen in sequence. A second coordinate of the point refers to a three dimensional coordinate detected by a depth device in a situation where the point is touched by a user.

The processor 602 is also configured to: calculate a mapping parameter between the first coordinate of the point and the second coordinate of the point according to the first coordinates of the N calibration points and the second coordinates of the N calibration points. The mapping parameter is used for acquiring a first coordinate of a touch point touched by the user in a situation where the user touches the display screen.

For instance, optionally, the processor 602 may be configured to: calculate mapping parameters $K_0$, $K_1$, $K_2$, $K_3$, $K_4$ and $K_5$ between the first coordinate of the point and the second coordinate of the point according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases},$$

in which $(M_0, N_0)$ is a first coordinate of a first calibration point; $(M_1, N_1)$ is a first coordinate of a second calibration point; $(M_2, N_2)$ is a first coordinate of a third calibration point; $(X_0, Y_0, Z_0)$ is a second coordinate of the first calibration point; $(X_1, Y_1, Z_1)$ is a second coordinate of the second calibration point; $(X_2, Y_2, Z_2)$ is a second coordinate of the third calibration point; and the first calibration point, the second calibration point and the third calibration point displayed on the display screen are not in the same straight line.

For instance, optionally, the processor 602 is also configured to: acquire the second coordinate of the touch point touched by the user in a situation where the user touches the display screen; and calculate the first coordinate of the touch point according to the second coordinate of the touch point and the mapping parameter.

For instance, the optionally, the processor 602 may be configured to: calculate the first coordinate of the touch point according to $$\begin{cases} M = K_0 X + K_1 Y + K_2 Z \\ N = K_3 X + K_4 Y + K_5 Z \end{cases},$$

in which (M, N) is the first coordinate of the touch point, and (X, Y, Z) is the second coordinate of the touch point.

For instance, optionally, the processor 602 is also configured to: detect whether the mapping parameter needs to be calibrated; and acquire the first coordinates of the N calibration points for user touch in a situation where the mapping parameter needs to be calibrated.

For instance, the touch implementation device provided by the embodiment of the present disclosure may be disposed in the electronic device such as the depth device or other electronic devices. Relevant explanation in the embodiment of the present disclosure can be referred to the above embodiments.

At least one embodiment of the present disclosure further provides an electronic device, which includes any one of the touch implementation devices provided by the embodiments. For instance, the electronic device may be a depth device or other electronic device provided with the depth device.

In a situation where the device provided by the embodiment of the present disclosure is disposed in the electronic device (e.g., the depth device), the electronic device can calculate the mapping parameter between the first coordinate and the second coordinate of the point according to the first coordinates and the second coordinates of the calibration points, and calculate the first coordinate of the touch point touched by the user by utilization of the mapping parameter upon the user touching the display screen of the electronic device, so as to touch control the electronic device. The device provided by the embodiment of the present disclosure allows some electronic devices without touch panels configured for achieving touch function can also achieve touch. On the other hand, electronic devices provided with display screens of different sizes can all achieve touch via the device, without the need of providing a touch panel to each electronic device, and hence the cost of the electronic device can be reduced.

It is to be understood that the system, device and method disclosed in the embodiments provided by the application can be achieved by other means. For instance, the embodiments of the device described above are only illustrative. For instance, the division of the units is only the division of logic functions. Another dividing means may be adopted in actual implementation. For instance, a plurality of units or components may be combined or integrated into another system, or some features may be ignored or not executed.

The unit described as a separating member may be or not be physically separate. The components displayed as units may be or not be physical units, namely may be disposed in one place or distributed on a plurality of network elements. Partial or all the units therein may be selected according to actual demands to achieve the objective of the proposal of the embodiment.

In addition, the functional units in the embodiments of the present disclosure may be integrated into a processing unit, or the units may be physically independent of each other, or two or more than two units may be integrated into a unit. The integrated unit not only may be achieved in hardware but also may be achieved by hardware and software functional units.

The foregoing storage medium includes: a medium capable of storing program codes such as a read-only memory (ROM), a random access memory (RAM) and a disk.

What are described above is related to the illustrative embodiments of the disclosure only and not limitative to the scope of the disclosure; the scopes of the disclosure are defined by the accompanying claims.

This application claims the benefit of Chinese Patent Application No. 201510257058.9, filed on May 19, 2015, which is hereby entirely incorporated by reference as a part of the present application.

What is claimed is:

1. A touch implementation method, comprising:
    displaying N calibration points for user touch by a display screen of an electronic device, wherein after one calibration point is displayed on the display screen and touched by the user, a next calibration point is displayed;
    acquiring first coordinates of the N calibration points for user touch, wherein a first coordinate of a point refers to a pixel coordinate, at the display screen of the electronic device, of the point; the pixel coordinate is defined by a pixel distance to a default pixel at the display screen; first coordinates of at least three of the N calibration points allow the three of the N calibration points to be not in a same straight line upon the three of the N calibration points being displayed by the display screen; and N≥3 and N is an integer;
    acquiring second coordinates of the N calibration points, wherein a second coordinate of the point refers to a three-dimensional coordinate detected by a depth device upon the point being touched by a user; and
    calculating a mapping parameter between the first coordinate of the point and the second coordinate of the point according to the first coordinates of the N calibration points and the second coordinates of the N calibration points, wherein the mapping parameter is configured for acquiring a first coordinate of a touch point touched by the user upon the user touching the display screen.

2. The method according to claim 1, wherein
mapping parameters $K_0$, $K_1$, $K_2$, $K_3$, $K_4$ and $K_5$ between the first coordinate of the point and the second coordinate of the point are calculated according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases},$$

wherein $(M_0, N_0)$ is a first coordinate of a first calibration point; $(M_1, N_1)$ is a first coordinate of a second calibration point; $(M_2, N_2)$ is a first coordinate of a third calibration point; $(X_0, Y_0, Z_0)$ is a second coordinate of the first calibration point; $(X_1, Y_1, Z_1)$ is a second coordinate of the second calibration point; $(X_2, Y_2, Z_2)$ is a second coordinate of the third calibration point; and the first calibration point, the second calibration point and the third calibration point displayed by the display screen are not in the same straight line.

3. The method according to claim 2, wherein after calculating the mapping parameter, the method further comprises:
    acquiring a second coordinate of the touch point touched by the user upon the user touching the display screen; and
    calculating the first coordinate of the touch point according to the second coordinate of the touch point and the mapping parameter.

4. The method according to claim 3, wherein
the first coordinate of the touch point is calculated according to $$\begin{cases} M = K_0 X + K_1 Y + K_2 Z \\ N = K_3 X + K_4 Y + K_5 Z \end{cases},$$

wherein (M, N) is the first coordinate of the touch point, and (X, Y, Z) is the second coordinate of the touch point.

5. The method according to claim 1, wherein
mapping parameters $K_0$, $K_1$, $K_2$, $K_3$, $K_4$ and $K_5$ between the first coordinate of the point and the second coordinate of the point are calculated according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases},$$

wherein $(M_0, N_0)$ is a first coordinate of a first calibration point; $(M_1, N_1)$ is a first coordinate of a second calibration point; $(M_2, N_2)$ is a first coordinate of a third calibration point; $(X_0, Y_0, Z_0)$ is a second coordinate of the first calibration point; $(X_1, Y_1, Z_1)$ is a second coordinate of the second calibration point; $(X_2, Y_2, Z_2)$ is a second coordinate of the third calibration point; and the first calibration point, the second calibration point and the third calibration point displayed by the display screen are not in the same straight line.

6. The method according to claim 5, wherein
the first coordinate of the touch point is calculated according to $$\begin{cases} M = K_0 X + K_1 Y + K_2 Z \\ N = K_3 X + K_4 Y + K_5 Z \end{cases},$$

wherein (M, N) is the first coordinate of the touch point, and (X, Y, Z) is a second coordinate of the touch point.

7. The method according to claim 1, wherein after calculating the mapping parameter, the method further comprises:
acquiring a second coordinate of the touch point touched by the user upon the user touching the display screen; and
calculating the first coordinate of the touch point according to the second coordinate of the touch point and the mapping parameter.

8. The method according to claim 1, wherein before acquiring the first coordinates of the N calibration points for user touch, the method further comprises:
detecting whether the mapping parameter needs to be calibrated,
wherein acquiring the first coordinates of the N calibration points for user touch comprises: acquiring the first coordinates of the N calibration points for user touch in a situation where the mapping parameter needs to be calibrated.

9. A touch implementation device, comprising:
a display screen configured to display N calibration points for user touch, wherein after one calibration point is displayed on the display screen and touched by the user, a next calibration point is displayed;
a first acquisition unit configured to acquire first coordinates of the N calibration points for user touch, wherein a first coordinate of a point refers to a pixel coordinate of the point at the display screen; the pixel coordinate is defined by a pixel distance to a default pixel at the display screen; first coordinates of at least three of the N calibration points allow the three of the N calibration points to be not in a same straight line upon the three of the N calibration points being displayed by the display screen; and N≥3 and N is an integer;
a second acquisition unit configured to acquire second coordinates of the N calibration points, wherein a second coordinate of the point refers to a three-dimensional coordinate detected by a depth device upon the point being touched by a user; and
a first calculating element configured to calculate a mapping parameter between the first coordinate of the point and the second coordinate of the point according to the first coordinates of the N calibration points and the second coordinates of the N calibration points, wherein the mapping parameter is configure for acquiring a first coordinate of a touch point touched by the user upon the user touching the display screen.

10. The device according to claim 9, wherein the first calculating element is configured to:

calculate mapping parameters $K_0, K_1, K_2, K_3, K_4$ and $K_5$ between the first coordinate of the point and the second coordinate of the point according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases},$$

wherein $(M_0, N_0)$ is a first coordinate of a first calibration point; $(M_1, N_1)$ is a first coordinate of a second calibration point; $(M_2, N_2)$ is a first coordinate of a third calibration point; $(X_0, Y_0, Z_0)$ is a second coordinate of the first calibration point; $(X_1, Y_1, Z_1)$ is a second coordinate of the second calibration point; $(X_2, Y_2, Z_2)$ is a second coordinate of the third calibration point; and the first calibration point, the second calibration point and the third calibration point displayed by the display screen are not in the same straight line.

11. The device according to claim 10, wherein
the second acquisition unit is also configured to acquire a second coordinate of the touch point touched by the user upon the user touching the display screen; and
the device further comprises a second calculating element configured to calculate the first coordinate of the touch point according to the second coordinate of the touch point and the mapping parameter.

12. The device according to claim 11, wherein the second calculating element is configured to:
calculate the first coordinate of the touch point according to $$\begin{cases} M = K_0 X + K_1 Y + K_2 Z \\ N = K_3 X + K_4 Y + K_5 Z \end{cases},$$

wherein (M, N) is the first coordinate of the touch point, and (X, Y, Z) is the second coordinate of the touch point.

13. The device according to claim 9, wherein the first calculating element is configured to:
calculate mapping parameters $K_0, K_1, K_2, K_3, K_4$ and $K_5$ between the first coordinate of the point and the second coordinate of the point according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases},$$

wherein, $(M_0, N_0)$ is a first coordinate of a first calibration point; $(M_1, N_1)$ is a first coordinate of a second calibration point; $(M_2, N_2)$ is a first coordinate of a third calibration point; $(X_0, Y_0, Z_0)$ is a second coordinate of the first calibration point; $(X_1, Y_1, Z_1)$ is a second coordinate of the second calibration point; $(X_2, Y_2, Z_2)$ is a second coordinate of the third calibration point; and the first calibration point, the second calibration point and the third calibration point displayed by the display screen are not in the same straight line.

14. The device according to claim 13, wherein the second calculating element is configured to:
calculate the first coordinate of the touch point according to $$\begin{cases} M = K_0 X + K_1 Y + K_2 Z \\ N = K_3 X + K_4 Y + K_5 Z \end{cases},$$

wherein (M, N) is the first coordinate of the touch point, and (X, Y, Z) is a second coordinate of the touch point.

15. The device according to claim 9, wherein
the second acquisition unit is also configured to acquire a second coordinate of the touch point touched by the user upon the user touching the display screen; and
the device further comprises a second calculating element configured to calculate the first coordinate of the touch point according to the second coordinate of the touch point and the mapping parameter.

16. The device according to claim 9, further comprising:
a detection unit configured to detect whether the mapping parameter needs to be calibrated,
wherein the first acquisition unit is configured to acquire the first coordinates of the N calibration points for user touch in a situation where the mapping parameter needs to be calibrated.

17. An electronic device, comprising the device according to claim 9.

18. A touch implementation device, comprising: a memory and a processor, wherein the memory is configured to store a code which is configured for controlling the processor to execute a following action:
displaying N calibration points for user touch by a display screen;
acquiring first coordinates of the N calibration points, wherein a first coordinate of a point refers to a pixel coordinate, at the display screen, of the point; and first coordinates of at least three of the calibration points allow the three of the calibration points to be not in a same straight line upon the three of the calibration points being displayed by the display screen;
acquiring second coordinates of the N calibration points, wherein a second coordinate of the point refers to a three-dimensional coordinate detected by a depth device upon the point being touched by a user; and
calculating a mapping parameter between the first coordinate of the point and the second coordinate of the point according to the first coordinates of the N calibration points and the second coordinates of the N calibration points, wherein the mapping parameter is configured for acquiring a first coordinate of a touch point touched by the user upon the user touching the display screen,
wherein
mapping parameters $K_0$, $K_1$, $K_2$, $K_3$, $K_4$ and $K_5$ between the first coordinate of the point and the second coordinate of the point are calculated according to $$\begin{cases} M_0 = K_0 X_0 + K_1 Y_0 + K_2 Z_0 \\ N_0 = K_3 X_0 + K_4 Y_0 + K_5 Z_0 \\ M_1 = K_0 X_1 + K_1 Y_1 + K_2 Z_1 \\ N_1 = K_3 X_1 + K_4 Y_1 + K_5 Z_1 \\ M_2 = K_0 X_2 + K_1 Y_2 + K_2 Z_2 \\ N_2 = K_3 X_2 + K_4 Y_2 + K_5 Z_2 \end{cases},$$

wherein $(M_0, N_0)$ is a first coordinate of a first calibration point; $(M_1, N_1)$ is a first coordinate of a second calibration point; $(M_2, N_2)$ is a first coordinate of a third calibration point; $(X_0, Y_0, Z_0)$ is a second coordinate of the first calibration point; $(X_1, Y_1, Z_1)$ is a second coordinate of the second calibration point; $(X_2, Y_2, Z_2)$ is a second coordinate of the third calibration point; and the first calibration point, the second calibration point and the third calibration point displayed by the display screen are not in the same straight line.

* * * * *